L. S. HACKNEY.
TRACTION VEHICLE.
APPLICATION FILED JUNE 24, 1914.

1,186,310.

Patented June 6, 1916
3 SHEETS—SHEET 1.

Witnesses

Inventor
Leslie S. Hackney
by John E. Dryker Atty.

L. S. HACKNEY.
TRACTION VEHICLE.
APPLICATION FILED JUNE 24, 1914.

1,186,310.

Patented June 6, 1916.
3 SHEETS—SHEET 2.

Witnesses

Inventor
Leslie S. Hackney
by John E. Stryker Atty

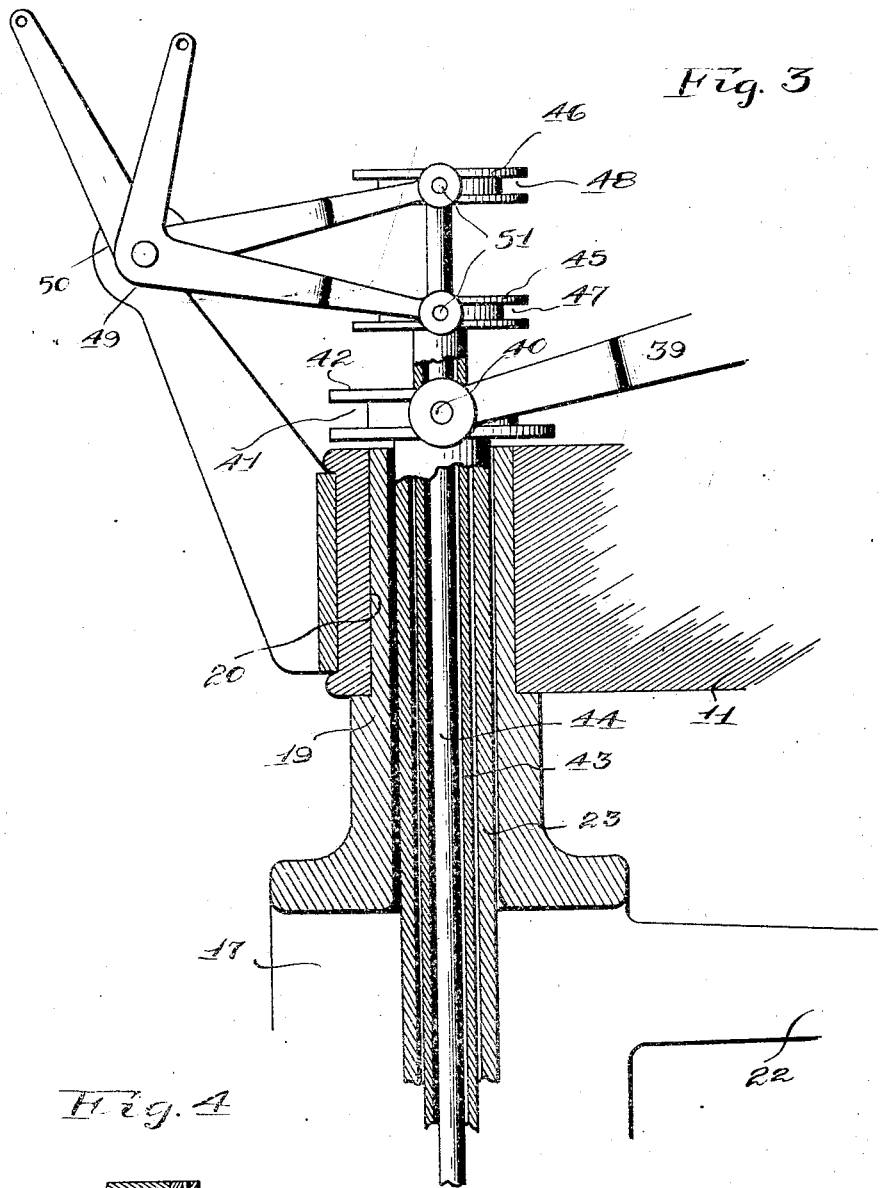

UNITED STATES PATENT OFFICE.

LESLIE S. HACKNEY, OF ST. PAUL, MINNESOTA.

TRACTION-VEHICLE.

1,186,310.  Specification of Letters Patent.  Patented June 6, 1916.

Application filed June 24, 1914. Serial No. 847,003.

*To all whom it may concern:*

Be it known that I, LESLIE S. HACKNEY, a citizen of the United States, residing at St. Paul, in the county of Ramsey and State of Minnesota, have invented new and useful Improvements in Traction-Vehicles, of which the following is a specification.

My invention relates to improvements in traction vehicles. Its object is to provide a traction vehicle having a self contained power truck adapted to propel and guide the vehicle, said truck being furnished with controlling devices within easy reach of an operator upon the vehicle.

Figure 1:
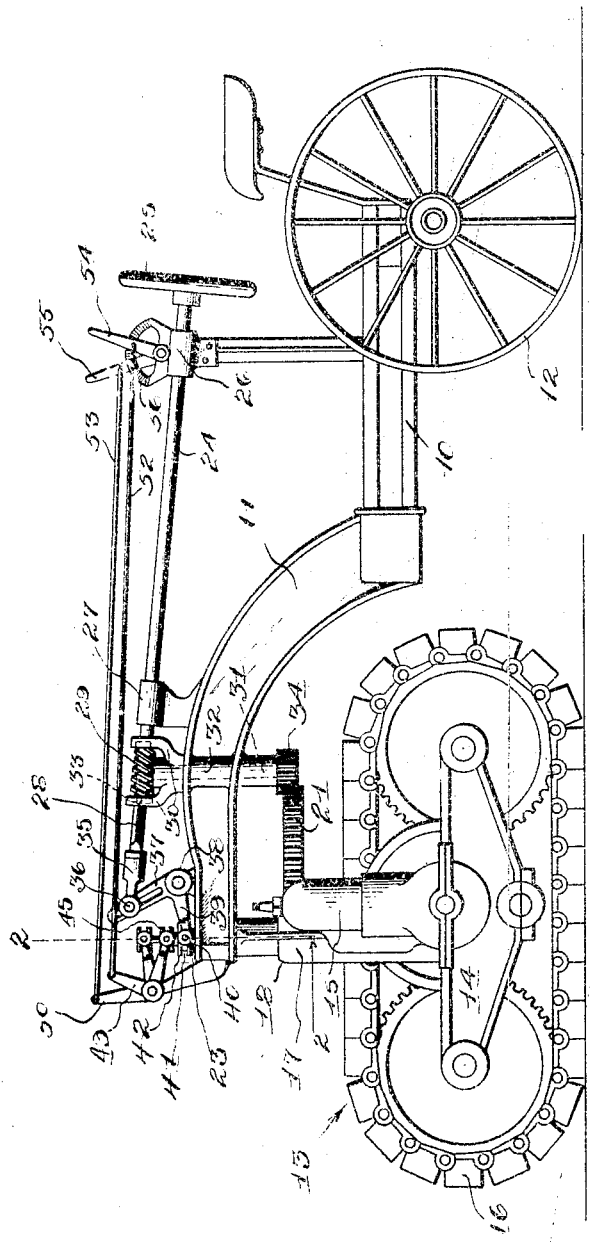
Figure 2:
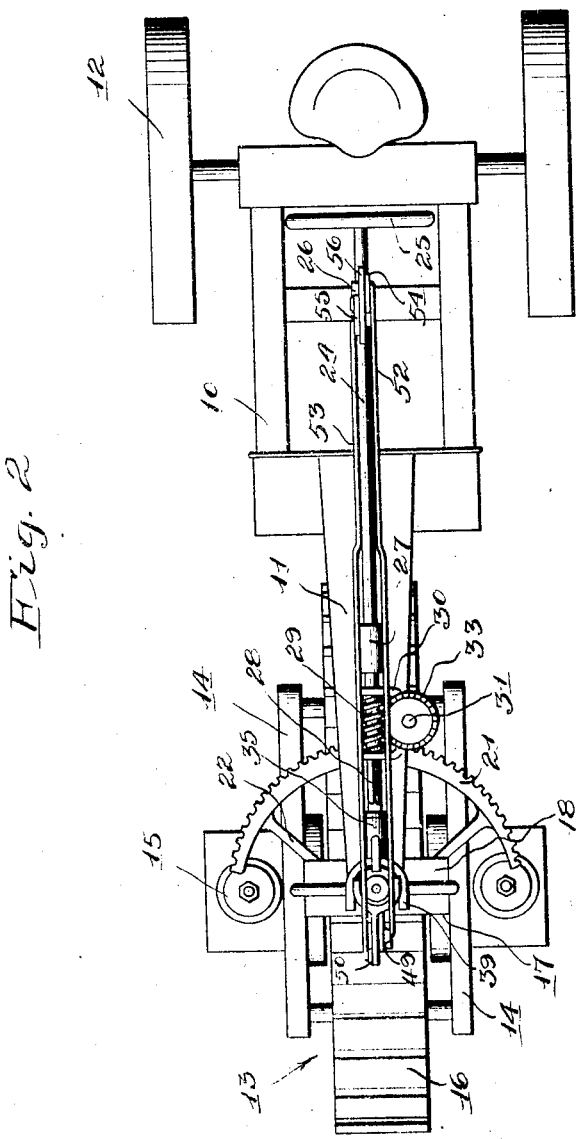

In the accompanying drawings Figure 1 is a side elevation of my improved traction vehicle; Fig. 2 is a plan view thereof; Fig. 3 is an enlarged sectional view taken on the line 2—2 of Fig. 1 and Fig. 4 is an enlarged detail view partly broken away to show a particular part of my improved device.

Referring to the drawings, I have used the reference numeral 10 to indicate the draft frame of the vehicle and 11 the large gooseneck at the forward end thereof. Idler supporting wheels 12 are mounted at the rear end of the frame 10 and the power truck 13 is swiveled in the goose-neck 11 to carry the front end of said draft frame.

The truck consists of rocker-beams 14 having an engine 15 and an endless tread 16 or like carrying device mounted upon said rocker-beams and driven by the engine 15 through suitable power transmitting devices, not shown. The beams 14 of the truck are pivotally attached to the arms 17 of the fork 18 which has a hollow post 19 swiveled in the bore 20 in the goose-neck 11. A rack quadrant 21 is mounted upon and secured by braces 22 to the arms 17 of said fork and a sleeve 23 is slidable within said post 19. The rack quadrant 21 is moved to turn the truck and guide the vehicle and the sleeve 23 is reciprocated to control the power transmitting mechanism of the truck. To perform these operations I provide a steering shaft 24 having a hand wheel 25 thereon. Said shaft is revoluble and slidable in the bearing 26 on the frame 10 and bearing 27 on the goose-neck 11 and is provided with a portion 28 square in cross section, said portion being adapted to freely slide through a worm 29 between keepers 30 and turn said worm when rotated. The shaft 31, revoluble in the upright bearing 32 in the goose-neck 11 is supplied at its upper end with a worm gear 33 which meshes with the worm 29 and is also provided at its lower end with a spur gear 34 meshing with the rack quadrant 21 on the fork 18. The clevis 35 swiveled upon the forward end of said shaft 24 is slidably connected by the pintle 36 to the slotted arm 37 of a bell crank 38 on the goose-neck. The outer arm 39 of said bell crank is bifurcated at its free end and opposed pins 40 secured in the branches of said arm slidably rest in the annular groove 41 in the collar 42 which is attached to the upper end of the sleeve 23.

Rotation of the hand wheel 25 turns the shaft 24 and operates through the worm 29, gears 33 and 34 and rack 21 to guide the truck, and the reciprocation of said wheel causes the shaft 24 to be moved back and forth, thus rocking the bell crank 38 and raising and lowering the sleeve 23, whereby the power transmitting mechanism of the truck is uniformly actuated regardless of the angular relation between the truck and frame.

An inner sleeve 43 and a rod 44 within said inner sleeve are independently reciprocated in said sleeve 23 and are suitably connected with the engine controlling devices, not shown, for actuating the same. Said sleeve 43 and rod 44 are respectively provided with collars 45 and 46, similar to the collar 42 above mentioned, having horizontal annular grooves 47 and 48 therein. Bell cranks 49 and 50 mounted upon the gooseneck 11 are furnished for said sleeve 43 and rod 44, each crank having one of its arms bifurcated, the branches thereof being provided with opposed pins 51 adapted to be slidably retained in said grooves 47 and 48. The other arms of said cranks 49 and 50 are respectively connected by actuating rods 52 and 53 with the levers 54 and 55 which are pivoted upon and frictionally engage opposite sides of the notched quadrant 56 on the frame.

Backward and forward movements of the lever 54 reciprocate the inner sleeve 43 and similar movements of the lever 55 reciprocate the rod 44.

Having now described my invention, what I claim as new and desire to protect by Letters Patent, is:

1. In a traction vehicle, a frame, supporting wheels on said frame, a truck carrying an engine for driving the same, a hollow support swiveled in said frame and mounted on said truck, a steering shaft slidable and revoluble on the frame, a hand wheel on the shaft, controlling means passing through said support to the power transmitting mechanism of the truck, said controlling means being in operative connection with said shaft and actuated by the reciprocation thereof and gearing in connection with the shaft for turning the truck when said shaft is rotated.

2. In a traction vehicle, a frame, supporting wheels on said frame, a truck carrying an engine for driving the same, a hollow support swiveled in said frame and mounted on said truck, a steering shaft slidable and revoluble on the frame, a hand wheel on the shaft, controlling means passing through said support to the power transmitting mechanism of the truck, said controlling means being in operative connection with said shaft and actuated by the reciprocation thereof, gearing in connection with the shaft for turning the truck when said shaft is rotated and flexible actuating means for the engine controlling devices passing through said support to positions accessible on the frame.

3. In a traction vehicle, a frame, supporting wheels on said frame, a goose-neck on the frame, a truck, a power plant on the truck for driving the same, a fork having branches and a hollow post at the union of said branches, said post being swiveled vertically in the goose-neck and the branches thereof being pivotally mounted on truck, a steering shaft slidable and revoluble on the frame, a rack quadrant on the fork, gearing, connecting said rack quadrant and shaft, adapted to turn said truck upon the rotation of said shaft, a sleeve or the like movable in the bore of said fork and connected with the transmitting mechanism of the power plant and a flexible joint between said sleeve and shaft, whereby upon reciprocation of the latter said sleeve is raised and lowered.

4. In a traction vehicle, a frame, supporting wheels on said frame, a goose-neck on the frame, a truck, a power plant on the truck for driving the same, a fork having branches and a hollow post at the union of said branches, said post being swiveled vertically in the goose-neck and the branches thereof being pivotally mounted on said truck, a steering shaft slidable and revoluble on the frame, a rack quadrant on the fork, gearing, connecting said rack quadrant and shaft, adapted to turn said truck upon the rotation of said shaft, a sleeve or the like movable in the bore of said fork and connected with the transmitting mechanism of the power plant, a flexible joint between said sleeve and shaft, whereby upon reciprocation of the latter said sleeve is raised and lowered, an inner sleeve within said first mentioned sleeve and an actuating rod on the frame flexibly connected with said inner sleeve for reciprocating the same.

5. In a traction vehicle, a frame, supporting wheels on said frame, a goose-neck on the frame, a truck, a power plant on the truck for driving the same, a fork having branches and a hollow post at the union of said branches, said fork being swiveled vertically in the goose-neck and the branches thereof being pivotally mounted on said truck, a steering shaft slidable and revoluble on the frame, a rack quadrant on the fork, gearing, connecting said rack quadrant and shaft, adapted to turn said truck upon the rotation of said shaft, a sleeve or the like movable in the bore of said fork and connected with the transmitting mechanism of the power plant, a flexible joint between said sleeve and shaft, whereby upon reciprocation of the latter said sleeve is raised and lowered, an inner sleeve within said first mentioned sleeve and actuating rods respectively attached to said inner sleeve and rod for reciprocating the same, the joints between said actuating rods and said sleeve and rods being flexible to maintain the adjustments thereof when said truck is turned.

In testimony whereof, I have signed my name to this specification in the presence of two subscribing witnesses.

LESLIE S. HACKNEY.

Witnesses:
F. C. CASWELL,
LOUIS JOHNSON.